US012275355B1

(12) United States Patent
Ciambriello et al.

(10) Patent No.: US 12,275,355 B1
(45) Date of Patent: Apr. 15, 2025

(54) MAGNETICALLY MOUNTABLE USER INTERFACE DEVICE AND ASSOCIATED METHOD OF USE

(71) Applicant: Intellitec Products LLC, Deland, FL (US)

(72) Inventors: John Austin Ciambriello, Deland, FL (US); Edward Alan Schiff, St. Petersburg, FL (US)

(73) Assignee: Intellitec Products LLC, Deland, FL (US)

( * ) Notice: Subject to any disclaimer, the term of this patent is extended or adjusted under 35 U.S.C. 154(b) by 0 days.

(21) Appl. No.: 17/667,804

(22) Filed: Feb. 9, 2022

Related U.S. Application Data

(60) Provisional application No. 63/147,354, filed on Feb. 9, 2021.

(51) Int. Cl.
| | | |
|---|---|---|
| B60R 11/02 | (2006.01) | |
| B60K 35/10 | (2024.01) | |
| B60K 35/25 | (2024.01) | |
| B60R 11/00 | (2006.01) | |
| B60R 16/02 | (2006.01) | |
| G06F 3/044 | (2006.01) | |
| G06F 3/147 | (2006.01) | |

(52) U.S. Cl.
CPC .......... B60R 11/0235 (2013.01); B60K 35/10 (2024.01); B60R 16/0222 (2013.01); G06F 3/044 (2013.01); G06F 3/147 (2013.01); *B60K 35/25* (2024.01); *B60K 2360/143* (2024.01); *B60R 2011/0057* (2013.01)

(58) Field of Classification Search
None
See application file for complete search history.

(56) References Cited

U.S. PATENT DOCUMENTS

| | | | |
|---|---|---|---|
| 10,615,618 B1* | 4/2020 | Hires | G06F 1/1613 |
| 2007/0057924 A1* | 3/2007 | Prados | B60K 35/00 |
| | | | 345/173 |
| 2009/0210110 A1* | 8/2009 | Dybalski | H04L 67/125 |
| | | | 345/173 |
| 2014/0118270 A1* | 5/2014 | Moses | G06F 1/1607 |
| | | | 345/173 |
| 2015/0346891 A1* | 12/2015 | Miller | G06F 3/042 |
| | | | 156/60 |
| 2016/0345045 A1* | 11/2016 | Liu | H04N 21/41422 |
| 2017/0182951 A1* | 6/2017 | Shepherd | B60R 11/0252 |
| 2017/0220310 A1* | 8/2017 | Hochman | H01R 13/6205 |
| 2019/0012032 A1* | 1/2019 | Brandao Salgado | G06F 3/041 |
| 2020/0272273 A1* | 8/2020 | Aubry | G06F 3/016 |
| 2022/0137662 A1* | 5/2022 | Campbell | A47K 3/001 |
| | | | 361/679.21 |

* cited by examiner

*Primary Examiner* — Christopher R Lamb
(74) *Attorney, Agent, or Firm* — Molly L. Sauter; Smith & Hopen, P.A.

(57) ABSTRACT

A magnetically mountable user interface device for use in various vehicles and vessels. The magnetically mountable user interface device includes a frame having magnetic properties to be secured to a surface of the vehicle/vessel, a touch surface having a back side and a front side, a printed circuit board mounted to the back side of the touch surface and one or more magnetic elements secured on the back side of the touch surface, the one or more magnetic elements positioned to magnetically couple with the frame having magnetic properties.

16 Claims, 6 Drawing Sheets

MAGNETICALLY MOUNTABLE USER INTERFACE DEVICE AND ASSOCIATED METHOD OF USE

CROSS-REFERENCE TO RELATED APPLICATIONS

This application claims priority to U.S. Provisional Patent Application No. 63/147,354, filed Feb. 9, 2021, and entitled "MAGNETICALLY MOUNTED USER INTERFACE DEVICE AND ASSOCIATED METHOD OF USE", which is herein incorporated by reference in its entirety.

BACKGROUND OF THE INVENTION

User interface devices are commonly used in recreational vehicles and marine vessels as a means to control and/or monitor various electronic devices operating within the vehicle. For example, a user interface device may be used to control lighting and climate conditions in various locations of the vehicle, to extend and retract awnings and to monitor battery levels. To provide for efficient control and monitoring of the various devices, one or more user interface devices may be positioned throughout the vehicle.

User interface devices are known to include tactile switch panels and capacitive/resistive touch displays that are typically mounted to a surface, such as a wall of a vehicle. Commonly, the user interface device includes a frame surrounding the display that is secured to the wall using screws or other fastening devices. Alternatively, a wall mounting frame may also be used to secure the frame of the device to the wall of the vehicle.

While the previous methods known in the art for securing the user interface device to the wall of the vehicle are adequate, their use has some undesirable results. For example, the screws that are used to secure the device to the wall need to be individually removed in order to service the device or the wiring behind the device, which is time consuming and may affect the long-term reliability of the connection. Additionally, the use of a frame and a wall mounting frame causes the user interface device to substantially protrude from the wall, which is undesirable in a setting such as a recreational vehicle or boat where space is extremely limited. Also, the requirement of a mounting frame undesirably reduces the usable space of the visual display.

Accordingly, what is needed in the art is an improved user interface device for use in mobile applications, including, but not limited to, recreational vehicles (RVs), marine vessels, specialty vehicles, emergency vehicles and other vehicles or vessels.

SUMMARY OF THE INVENTION

In various embodiments, the present invention provides an improved user interface device for use in recreational vehicles, marine vessels or other various other vehicles.

In one embodiment, the present invention provides a magnetically mountable user interface device comprising a frame having magnetic properties to be secured to a surface, a user interface device including a touch surface having a back side and a front side, a printed circuit board mounted to the back side of the touch surface and one or more magnetic elements secured on the back side of the touch surface, the one or more magnetic elements positioned to magnetically couple with the frame having magnetic properties.

In particular, the frame having magnetic properties includes an aperture that is dimensioned to receive the printed circuit board mounted to the back side of the touch surface. The frame having magnetic properties may additionally include one or more fastening apertures to receive one or more fasteners for mounting the frame having magnetic properties to a surface. In a specific embodiment, the fasteners may be screws that are used to secure the frame having magnetic properties to the wall of a vehicle or vessel.

In one embodiment, the magnetic elements may be magnetic strips attached to the back side of the touch surface. In another embodiment, the magnetic elements may be magnetic discs secured within a gromet to be attached to the back side of the touch surface.

In particular, the frame having magnetic properties includes an aperture that is dimensioned to receive the printed circuit board mounted to the back side of the touch surface. The frame having magnetic properties may additionally include one or more fastening apertures to receive one or more fasteners for mounting the frame having magnetic properties to a surface. In a specific embodiment, the fasteners may be screws that are used to secure the frame having magnetic properties to the wall of a vehicle or vessel.

In an additional embodiment, the present invention provides a method for securing a user interface device to a surface. The method includes, securing a frame having magnetic properties to a surface and magnetically coupling the user interface device to the frame having magnetic properties, wherein the user interface device includes a touch surface having a back side and a front side, a printed circuit board mounted to the back side of the touch surface and one or more magnetic elements secured on the back side of the touch surface, the one or more magnetic elements positioned to magnetically couple with the frame having magnetic properties.

As such, in various embodiments, the present invention provides an improved magnetically mountable user interface device and an associated method for securing the user interface device to a desired surface, such as a surface of a vehicle or vessel.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

DETAILED DESCRIPTION OF THE INVENTION

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications, and equivalents, which may be included within the spirit and scope of the various embodiments as defined by the appended claims. Furthermore, in this Detailed Description of the Invention, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

It will be understood that, although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1A:
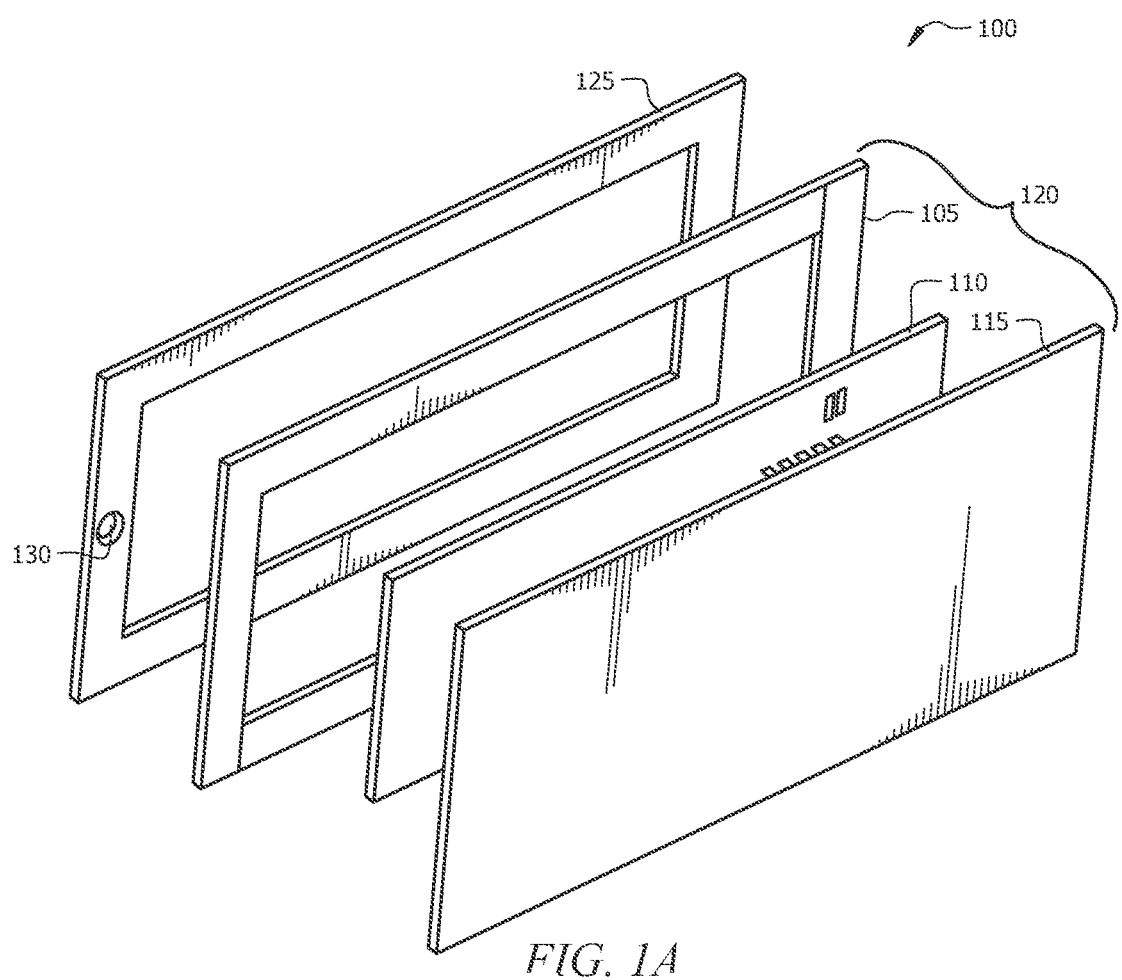
FIG. 1A is a first diagrammatic view of the elements of a magnetically mountable user interface device comprising magnetic strips, in accordance with an embodiment of the present invention.

With reference to FIG. 1A, in accordance with one embodiment, the magnetically mountable user interface device 100 of the present invention includes a user interface device 120 comprising a touch surface 115, a printed circuit board (PCB) 110 and one or more magnetic elements 105. The magnetically mountable user interface device 100 additionally includes a frame having magnetic properties 125 to be attached to a desired location for the placement of the user interface device 120, such as the wall of a recreational vehicle or marine vessel.

In the embodiment shown in FIG. 1A, the user interface device 120 utilizes a capacitive or resistive touch screen comprising a touch surface 115 that may be composed of glass or acrylic. Capacitive and resistive touch screens are well known in the art for translating physical touch into a command utilizing the circuitry fabricated on the PCB 110. In an exemplary capacitive sensor system, the touch surface 115 may be glass coated with a material such as indium tin oxide to enhance conductivity. A conductive input, such as a user's finger, may be used to register touch on the touch surface 115. The contact of the user's finger with the capacitive-based touch surface 115 alters the electrostatic field, which is then interpreted by the processor and device's software on the PCB 110 to translate the touch into an executable command to be performed by one or more devices in communication with the magnetically mountable user interface device 100.

While FIG. 1A illustrates a user interface device 120 having a touch surface 115 for use with a capacitive-based user interface device, this is not intended to be limiting, and the touch surface 115 may alternately be replaced by a tactile switch panel.

In the embodiment of FIG. 1A, the touch surface 115 is mounted to the PCB 110 and the one or more magnetic elements 105 are magnetic strips secured to the back of the touch surface 115 around the exterior of the PCB 110. The combination of the touch surface 115, the PCB 110 and the magnetic elements 105 form the user interface device 120.

The frame having magnetic properties 125 may include one or more fastening apertures 130 that can be used to secure the frame having magnetic properties 125 to a surface, such as a wall. In particular, screws may be inserted through the fastening apertures 130 and into the wall to effectively secure the frame having magnetic properties 120 to the wall. After the frame having magnetic properties 125 has been attached to the wall in the desired location, the user interface device 120 may be secured to the frame having magnetic properties 125 through the attractive force of the frame having magnetic properties 125 to the magnetic elements 105. In a specific embodiment, the frame having magnetic properties 125 may be made of steel and the magnetic elements 105 may be rare earth magnets, such as neodymium. The use of rare earth magnets is not intended to be limiting and various other magnets are within the scope of the present invention, including ferrites and alnico magnets.

While FIG. 1A illustrates the touch surface 115, the PCB 110 and the frame having magnetic properties 125 as being substantially rectangular, this is not intended to be limiting and the geometry of the touch surface 115, the PCB 110 and the frame having magnetic properties 125 may comprise various other shapes as required. Additionally, as shown in FIG. 1A, the frame having magnetic properties 125 includes an aperture that is dimensioned to receive the PCB 110 such that the one or more magnetic elements 105 are positioned to surround the PCB 110 and magnetically couple with the frame having magnetic properties 125.

Figure 1B:
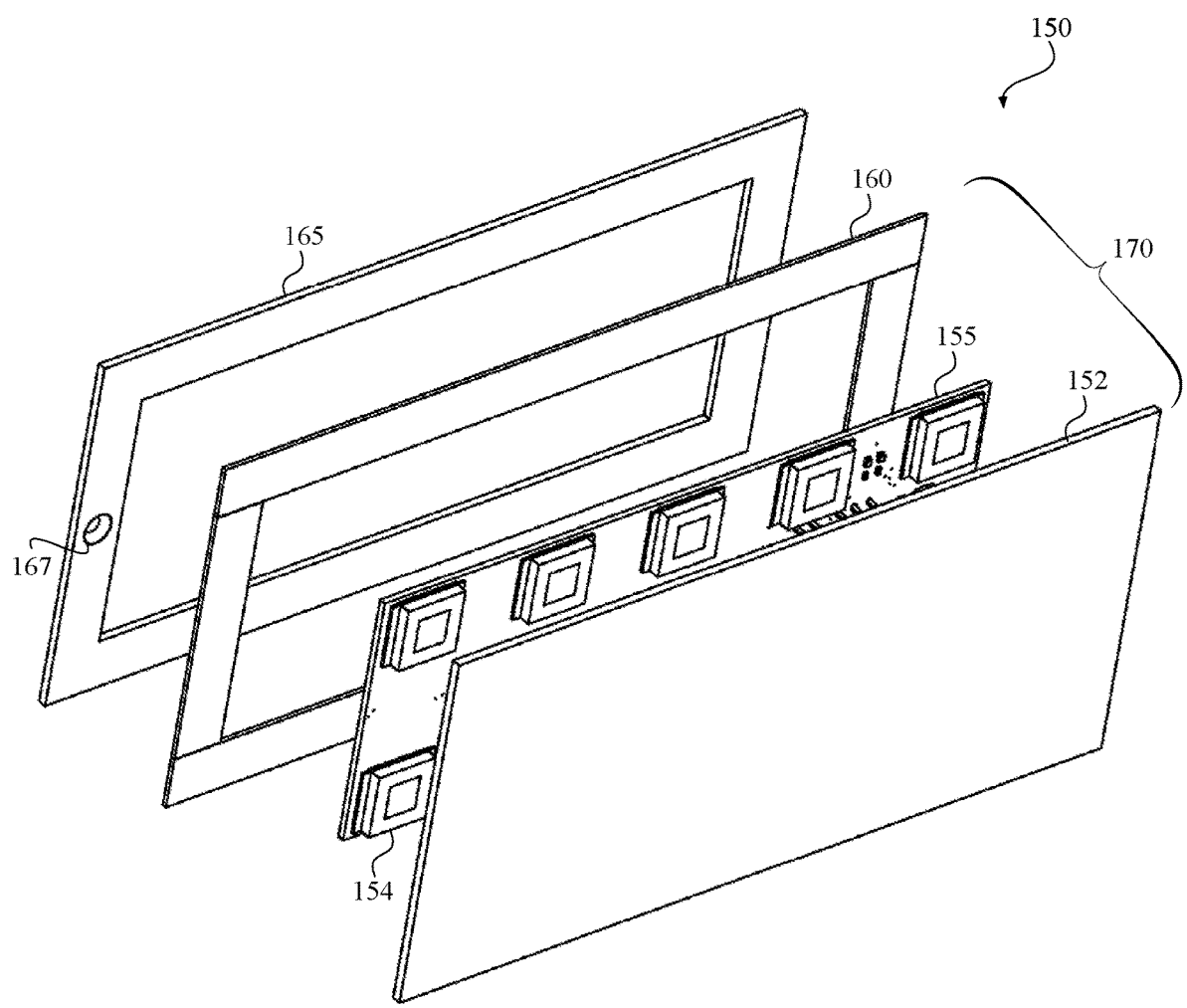
FIG. 1B is a second diagrammatic view of the elements of a magnetically mountable user interface device comprising magnetic strips, in accordance with an embodiment of the present invention.

With reference to FIG. 1B, in an additional embodiment, a magnetically mountable user interface device 150 of the present invention includes a user interface device 170 comprising a touch surface 152, a printed circuit board (PCB) 155 and one or more magnetic elements 160. The magnetically mountable user interface device 170 additionally includes a frame having magnetic properties 165 to be attached to a desired location for the placement of the user interface device 170, such as the wall of a recreational vehicle or marine vessel.

In the embodiment shown in FIG. 1B, the user interface device 170 utilizes a capacitive or resistive touch screen comprising a touch surface 152 that may be composed of glass or acrylic. Capacitive and resistive touch screens are well known in the art for translating physical touch into a command utilizing the circuitry fabricated on the PCB 155. The embodiment of FIG. 1B additionally illustrates the various switching elements 154 that may be positioned on the PCB 155 for communication with the touch surface 152. In the illustrated embodiment, the magnetic elements 160 are strips made of magnetic material. While the strips are shows as surrounding the entire perimeter of a back side of the touch surface 152, this is not intended to be limiting and magnetic strips 160 covering only a portion of the back side of the touch surface 152 are within PCB are with the scope of the present invention.

Figure 1C:
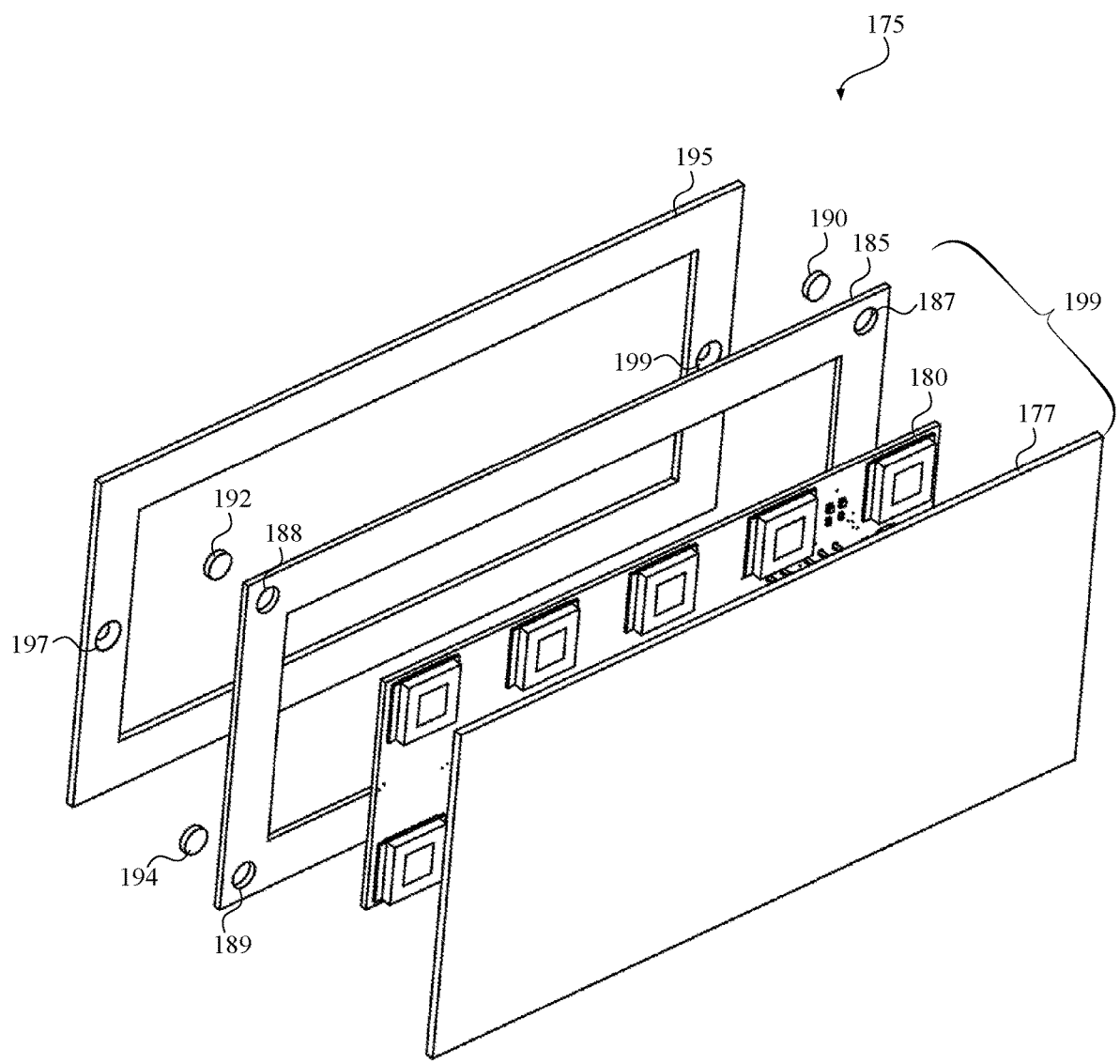
FIG. 1C is a diagrammatic view of the elements of a magnetically mountable user interface device comprising magnetic disks, in accordance with an embodiment of the present invention.

FIG. 1C illustrates an additional embodiment of the magnetically mountable user interface device 175 in accordance with the present invention. Similar to FIG. 1A and FIG. 1B, the device 175 includes a user interface device 179 comprising a touch surface 177, a printed circuit board (PCB) 180 and one or more magnetic elements 190, 192, 194. However, in this embodiment, the magnetic elements 190, 192, 194 are magnetic discs that are positioned within respective apertures 187, 188, 189 of a gromet 185. The gromet 185 is used to position the magnetic discs 190, 192, 194 on to the back side of the PCB to establish a flush view of the device 179 when mounted to a surface. In a particular embodiment, the magnetic discs 190, 192, 194 are neodymium magnetic discs.

Figure 2:
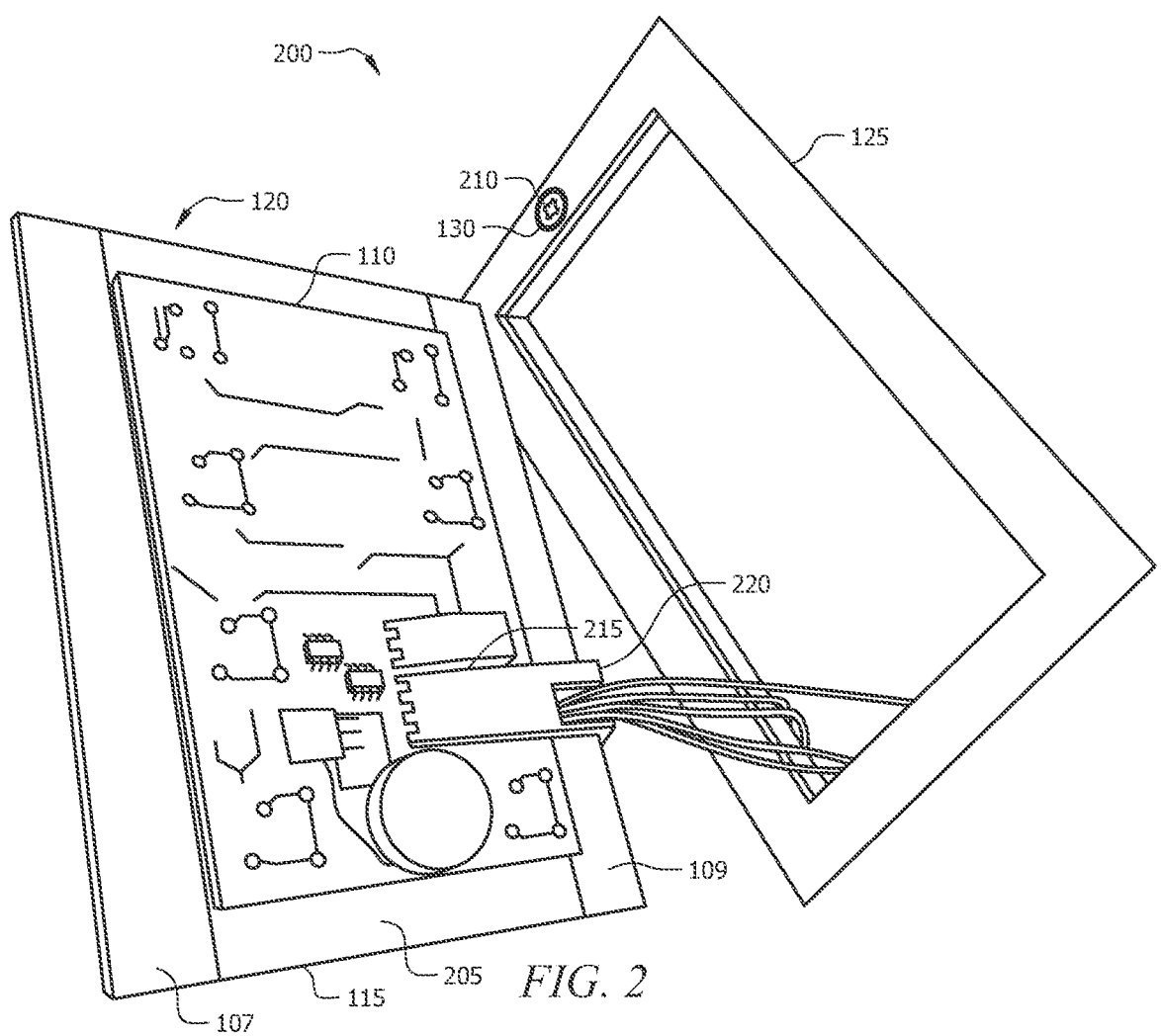
FIG. 2 is a diagrammatic view of a bottom side of a magnetically mountable user interface device, in accordance with an embodiment of the present invention.

The magnetically mountable user interface device 175 of FIG. 1C additionally includes a frame having magnetic properties 195 and apertures 197, 199 to be attached to a desired location for the placement of the user interface device 175, such as the wall of a recreational vehicle or marine vessel, as previously described in detail with reference to FIG. 1A and FIG. 1B FIG. 2 illustrates a back side 205 of the touch surface 115 of the user interface device 120, in greater detail. As shown in this embodiment, the one or more magnetic elements 105 may include a first magnetic strip 107 secured to the back side 205 of the touch surface 115 along a first side of the PCB 110 and a second magnetic strip 109 secured to the back side 205 of the touch surface 115 along a second side of the PCB 110. This positioning of the magnetic strips 107, 109 is not intended to be limiting and various other geometries and locations of the magnetic strips on the back side 205 of the touch surface 115 are within the scope of the present invention.

As shown in FIG. 2, the PCB 110 may include a connector 215 that may be coupled to a wiring harness 220 that provides wiring connections throughout the recreational vehicle. In a particular embodiment, the connector 215 may provide connections to a Controller Area Network (CAN) to allow for RV-C communications. RV-C is a communications protocol based on the CAN bus and is commonly used in recreational vehicles to allow communication between components of the system. RV-C can be used for control, coordination, and diagnostics, in a multi-vendor environment. Connections may also be provided to allow for National Marine Electronic Association (NMEA) protocol communications for marine-based vessels. In addition to utilizing CAN communication cabling, communications between the RV systems and the user interface device 120 of the present invention can also be accomplished using wireless techniques, such as Bluetooth. The use of RV-C and NMEA protocols is not intended to be limiting and the user interface device 120 may also be used with various other protocols, such as the SAE J1939 CAN protocol commonly used in automotive applications. Additionally, the user interface device 120 may optionally be used as a stand-alone device, absent a specific protocol application were a non-network protocol and stand-alone output drivers (i.e., field effect transistors (FETs) and relays) are employed.

After the wiring harness 220 has been connected to the connector 215 on the PCB 110, the user interface device 120 may be positioned such that the magnetic strips 107, 109 attach to the magnetic frame 125 that has been previously secured to the wall by one or more fasteners 210 inserted into one or more respective fastening apertures 130.

Figure 3:
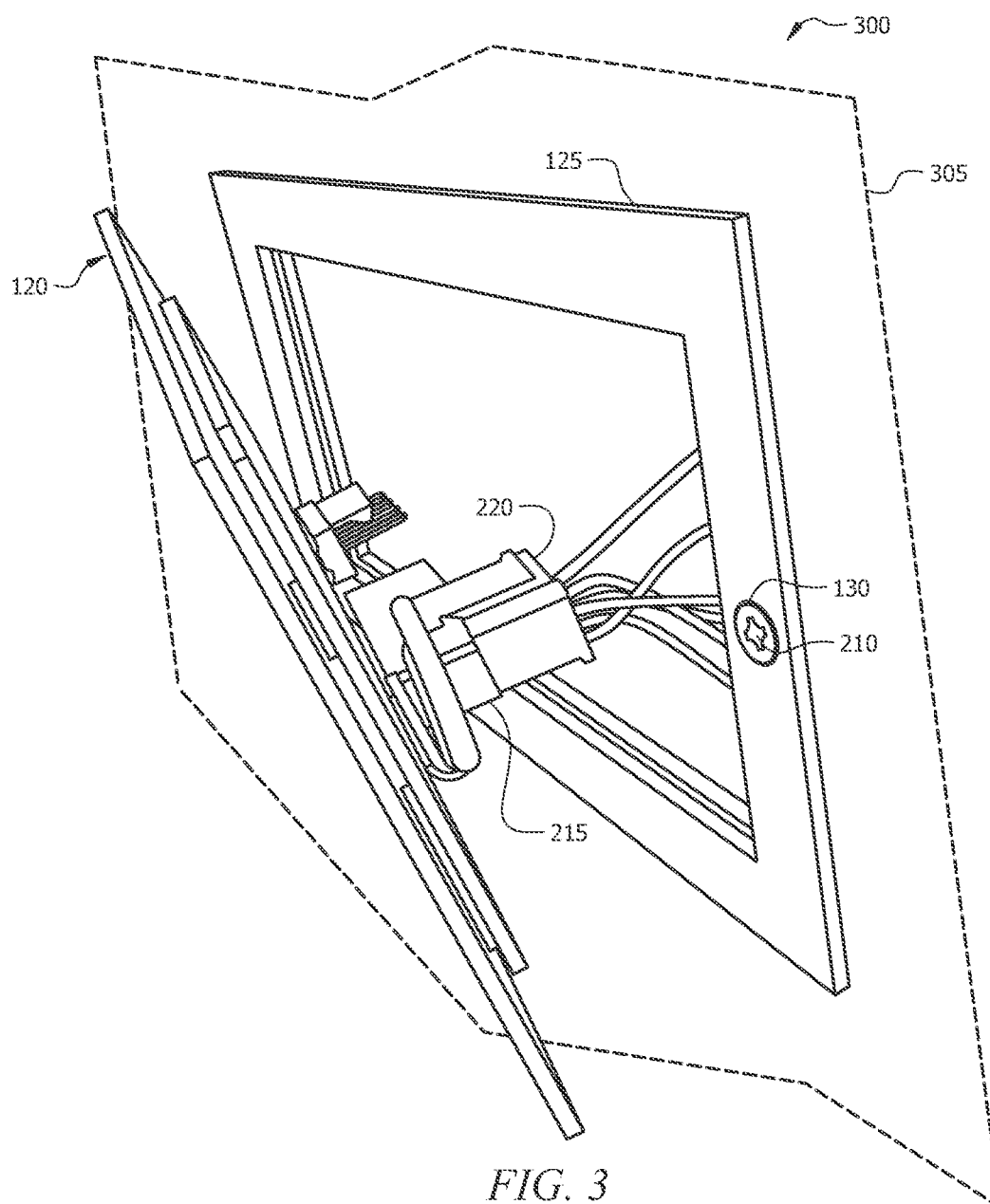
FIG. 3 is a diagrammatic view of a magnetically mountable user interface device being secured to a surface, in accordance with an embodiment of the present invention.

FIG. 3 provides another view of the magnetically mountable user interface device 300 of the present invention, which includes a user interface device 120 and a frame having magnetic properties 125. As shown, the frame having magnetic properties 125 is secured to a wall 305 by one or more fasteners 210 inserted through one or more respective fastening apertures 130 in the frame having magnetic properties 125. A wiring harness 220 is coupled to a connector 215 on the user interface device 120 prior to aligning the user interface device 120 with the frame having magnetic properties 125, thereby magnetically coupling the user interface device 120 to the frame having magnetic properties 125 to secure the user interface device 120 to the wall 305. The attachment of the user interface device 120 to the wall 305 using the frame having magnetic properties 125 is effective in securing the device under conditions such as shock and vibration, which may be common in moving vehicles.

While the user interface device 120 is securely attached to the wall through the magnetic attraction of the metallic strips 107, 109 on the back of the user interface device 120 and the frame having magnetic properties 125, it is also easy to remove the user interface device 120 from the wall without requiring the removal of any fastening device. As such, the present invention provides for a substantially flush mounting of the user interface device 120 to a surface and does not require the removal of any fastening devices to access the PCB or the wiring of the device. As such, by utilizing magnetic technology, the need for standard mounting practices, including but not limited to, screw fasteners and framing techniques are eliminated thereby providing a low-cost installation solution for proper positioning of the user interface device 120.

Figure 4:
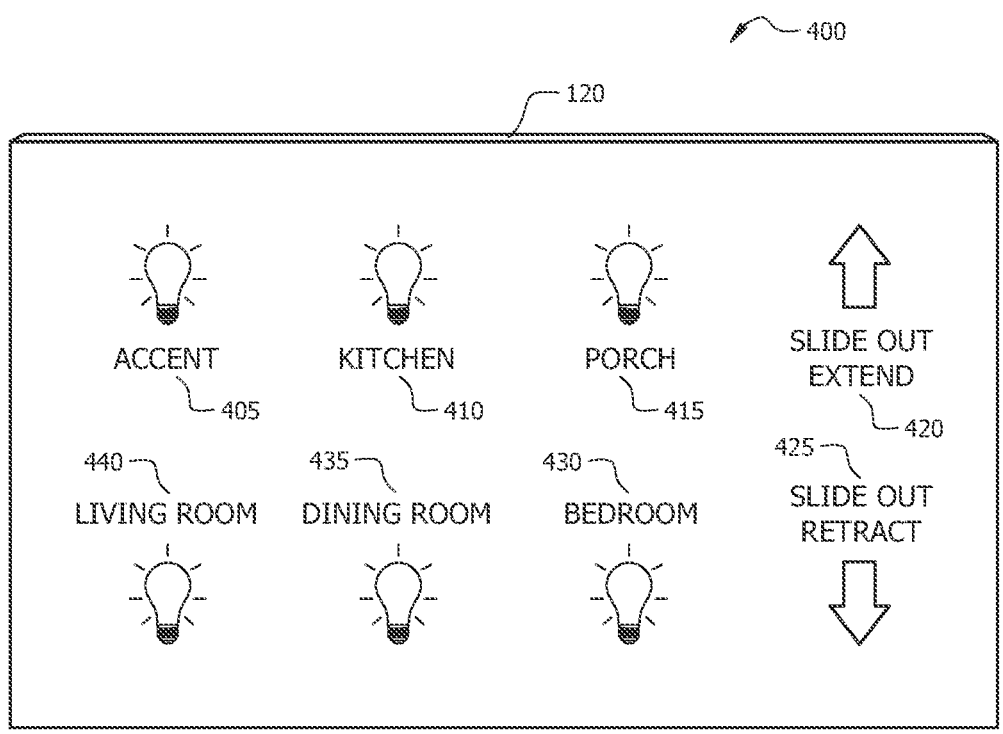
FIG. 4 is a diagrammatic view of a touch surface area of a magnetically mountable user interface device, in accordance with an embodiment of the present invention.

As shown in FIG. 4, the magnetically mountable user interface device 400 of the present invention does not require the use of a frame to secure the user interface device 120 to a surface. By utilizing the magnetic strips on the back of the touch surface of the user interface device 120, as previously shown in FIG. 1A, FIG. 1B, FIG. 1C and FIG. 2, the device can easily be magnetically mounted to a frame having magnetic properties 125 positioned on a wall without needing a frame to surround the touch surface. By eliminating the need for a frame, more of the touch surface can be utilized for control elements, such as controls for accent lighting 405, kitchen lighting 410, porch lighting 415, living room lighting 440, dining room lighting 435, bedroom lighting 430, slide out extend control 420 and slide out retract control 425. The illustrated control features on FIG. 4 are exemplary in nature and various other control elements are within the scope of the present invention as required for controlling features of recreational vehicles, marine vessels and vehicles in general.

In various embodiments, the present invention provides an improved system for securing a user interface device to a wall of a vehicle. The magnetic mounting capability of the user interface device of the present invention eliminates the need for fastening devices and frames surrounding the touch surface. The magnetic mounting and dismounting capabilities simplify the accessibility to the PCB and the wiring and the removal of the frame maximizes the usable area of the touch surface. Additionally, the magnetic mounting and dismounting capability provided by the present invention allows for easy adjustment of the user interface following initial installation to ensure that the touch surface is level. Eliminating the need for the use of fixed mounting holes to secure the user interface device to the wall allows for faster and more flexible installation of the device. The magnetic mounting feature of the present invention also allows the user interface device to be installed substantially flush with the wall, thereby providing a streamlined design while also conserving space in the vehicle.

What is claimed is:

1. A magnetically mountable user interface device, the device comprising:
  a frame having magnetic properties and one or more fastening apertures, the one or more fastening apertures dimensioned to receive one or more fasteners for mounting the frame to a substantially planar surface;
  a user interface device comprising;
    a touch surface having a back side and a front side, wherein the front side of the touch surface displays a plurality of control elements and wherein the touch surface is dimensioned to conceal the frame having magnetic properties;
    a printed circuit board mounted on the back side of the touch surface, wherein the printed circuit board is dimensioned to expose a portion of the back side of the touch surface surrounding the printed circuit board, and wherein the frame having magnetic properties comprises an aperture dimensioned to receive the printed circuit board; and
    one or more magnetic elements secured to the exposed portion on the back side of the touch surface surrounding the printed circuit board, the one or more magnetic elements positioned to magnetically couple the touch surface to the frame having magnetic properties, wherein the magnetic elements are positioned between the exposed portion on the back side of the touch surface surrounding the printed circuit board and the frame having magnetic properties when the touch surface is magnetically coupled to the frame having magnetic properties.

2. The device of claim 1, wherein the substantially planar surface is a wall of a vehicle/vessel.

3. The device of claim 1, wherein the touch surface is selected from a capacitive-based touch screen, a resistive-based touch screen and a tactile switch panel.

4. The device of claim 1, wherein the touch surface is a capacitive-based touch screen comprised of glass and coated with indium tin oxide.

5. The device of claim 1, wherein the printed circuit board comprises wired technology to communicate with a vehicle/vessel.

6. The device of claim 1, wherein the printed circuit board comprises wireless technology to communicate with a vehicle/vessel.

7. The device of claim 1, wherein the frame having magnetic properties is comprised of steel.

8. The device of claim 1, wherein the one or more magnetic elements are one or more magnetic strips.

9. The device of claim 1, wherein the one or more magnetic elements are one or more magnetic disks.

10. The device of claim 9, wherein the user interface device further comprises a gromet and wherein the one or more magnetic elements are secured within the gromet secured on the back side of the touch surface.

11. The device of claim 1, wherein the one or more magnetic elements are selected from rare earth magnets, ferrites and alnico magnets.

12. The device of claim 1, wherein the printed circuit board comprises a connector to be coupled to a wiring harness of a vehicle/vessel.

13. A method for magnetically mounting a user interface device, the method comprising:
  securing a frame having magnetic properties substantially flush with a surface of a vehicle/vessel;
  magnetically coupling a user interface device to the frame having magnetic properties, the user interface device comprising;
    a touch surface having a back side and a front side, wherein the front side of the touch surface displays a plurality of control elements and wherein the touch surface is dimensioned to conceal the frame having magnetic properties;
    a printed circuit board mounted on the back side of the touch surface, wherein the printed circuit board is dimensioned to expose a portion of the back side of the touch surface surrounding the printed circuit board, and wherein the frame having magnetic properties comprises an aperture dimensioned to receive the printed circuit board; and
    one or more magnetic elements secured to the exposed portion on the back side of the touch surface surrounding the printed circuit board, the one or more magnetic elements positioned to magnetically couple the touch surface to the frame having magnetic properties, wherein the magnetic elements are positioned between the exposed portion on the back side of the touch surface surrounding the printed circuit board and the frame having magnetic properties when the touch surface is magnetically coupled to the frame having magnetic properties.

14. The method of claim 13, further comprising, coupling a wiring harness of a vehicle/vessel to a connector of the printed circuit board.

15. The method of claim 13, wherein the one or more magnetic elements are selected from rare earth magnets, ferrites and alnico magnets.

16. The method of claim 13, wherein the one or more magnetic elements are fabricated of neodymium.

* * * * *